(12) United States Patent
Dal Pont et al.

(10) Patent No.: US 12,619,062 B2
(45) Date of Patent: May 5, 2026

(54) INTEGRATED OPTICAL DEVICE AND RELATED DIAGNOSTIC IMAGING METHOD

(71) Applicant: Giulia Dal Pont, Treviso (IT)

(72) Inventors: Giulia Dal Pont, Treviso (IT); Franco Dal Pont, Treviso (IT)

( * ) Notice: Subject to any disclaimer, the term of this patent is extended or adjusted under 35 U.S.C. 154(b) by 0 days.

(21) Appl. No.: 18/879,227

(22) PCT Filed: Jun. 30, 2023

(86) PCT No.: PCT/IT2023/050158
§ 371 (c)(1),
(2) Date: Dec. 26, 2024

(87) PCT Pub. No.: WO2024/003961
PCT Pub. Date: Jan. 4, 2024

(65) Prior Publication Data
US 2026/0003180 A1    Jan. 1, 2026

(30) Foreign Application Priority Data

Jul. 1, 2022    (IT) ........................ 102022000014020

(51) Int. Cl.
*G02B 21/36*        (2006.01)
*G02B 21/00*        (2006.01)
*G06F 3/033*        (2013.01)

(52) U.S. Cl.
CPC ....... *G02B 21/368* (2013.01); *G02B 21/0048* (2013.01); *G02B 21/0052* (2013.01); *G06F 3/033* (2013.01)

(58) Field of Classification Search
CPC .............. G02B 21/368; G02B 21/0048; G02B 21/0052; G06F 3/033; G06T 19/00; G06T 7/10
See application file for complete search history.

(56) References Cited

U.S. PATENT DOCUMENTS

2015/0346472 A1    12/2015    Saur et al.
2019/0265490 A1*    8/2019    Duckett, III ......... A61B 1/0019
(Continued)

FOREIGN PATENT DOCUMENTS

EP          3561795 A1    10/2019
WO       2016130424 A1    8/2016
(Continued)

OTHER PUBLICATIONS

International Preliminary Report on Patentability of PCT/IT2023/050158, dated Feb. 26, 2024.
(Continued)

*Primary Examiner* — Michael A Faragalla
(74) *Attorney, Agent, or Firm* — Platinum Intellectual Property PC

(57)    ABSTRACT
An integrated optical device comprising an optical instrument for producing real images comprising in turn eyepieces, an optical body, a binocular body and a support arm, and an instrumentation for producing virtual images, wherein said instrumentation for producing virtual images comprises at least a display (1) for projecting said virtual images, a lens (2) for adjusting the focus, a plurality of prisms (3) for inserting, directing, and mixing said virtual images, and a plurality of mirrors (4) and first cameras (5) for directing and positioning said virtual images so as to superimpose said virtual images on said real images in the eyepieces of said optical instrument.

8 Claims, 7 Drawing Sheets

(56) References Cited

U.S. PATENT DOCUMENTS

| 2019/0355182 | A1* | 11/2019 | Nozaki | G06T 19/20 |
| 2021/0173189 | A1* | 6/2021 | Sun | G02B 21/0072 |
| 2022/0157029 | A1* | 5/2022 | Horita | G06T 19/20 |
| 2022/0301268 | A1* | 9/2022 | Porat | A61B 90/36 |

FOREIGN PATENT DOCUMENTS

| WO | 2021090335 | A1 | 5/2021 | | |
| WO | WO 2021/090335 | | * | 5/2021 | A61B 90/20 |

OTHER PUBLICATIONS

International Search Report of PCT/IT2023/050158, dated Oct. 6, 2023.
Search Report of the counterpart Italian patent application No. 102022000014020, dated Feb. 22, 2023.
Office Communication from European Patent Office, dated Jun. 26, 2025.
Evident Industrial: "SZX-AR1 Augmented Reality Microscope System", , Apr. 26, 2022 (Apr. 26, 2022), XP093283601, Retrieved from the Internet: URL:https://www.youtube.com/watch?v=VSddknYhVt4.
Banda Hilary: "Media Contact", Apr. 26, 2022 (Apr. 26, 2022), pp. 1-2, XP093283602, Retrieved from the Internet: URL:https://www.olympus-global.com/news/2022/contents/nr02356/ nr02356 _ 00000. pdf.

* cited by examiner

100

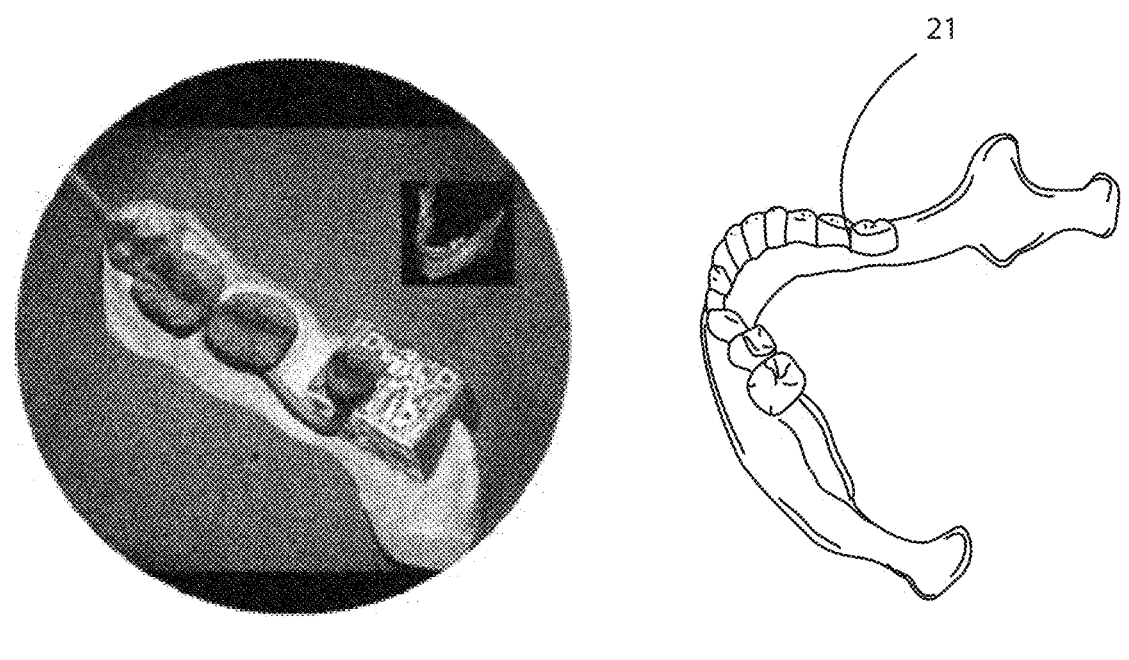
Fig. 12A
Fig. 12B
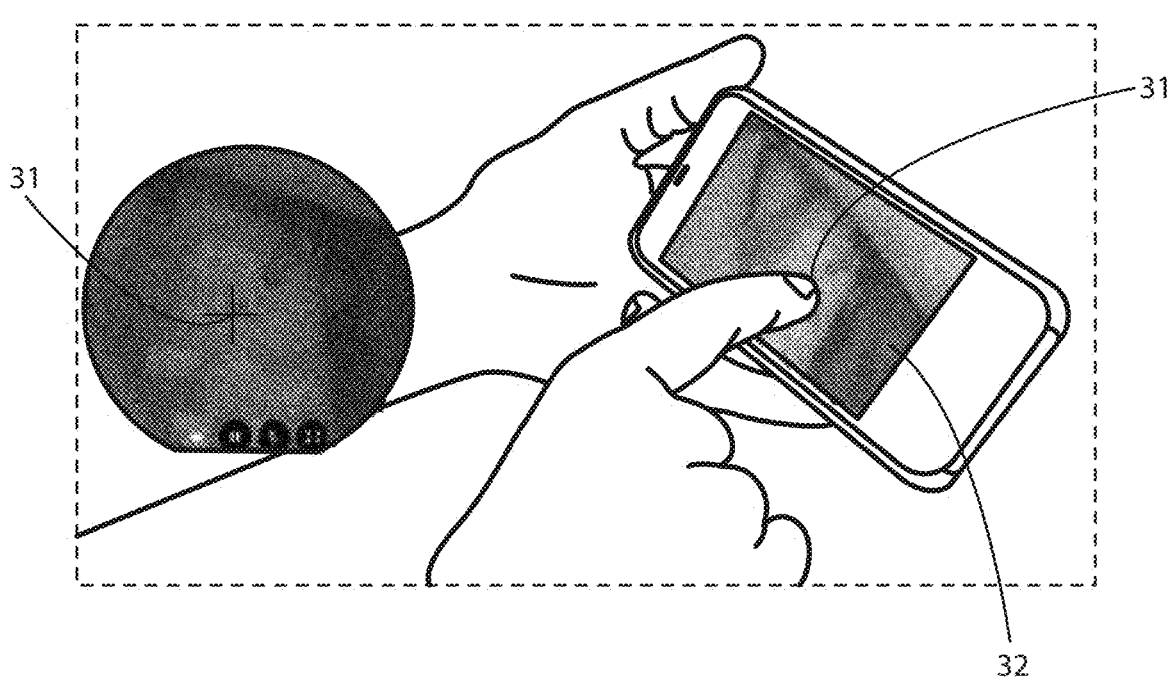
Fig. 13

INTEGRATED OPTICAL DEVICE AND RELATED DIAGNOSTIC IMAGING METHOD

RELATED APPLICATIONS

This application is a United States National Stage Application filed under 35 U.S.C § 371 of PCT Patent Application Serial No. PCT/IT2023/050158, filed Jun. 30, 2023, which claims priority to Italian Patent Application No. 102022000014020, filed Jul. 1, 2022, the disclosure of all of which are hereby incorporated by reference in their entirety.

The present invention concerns an integrated optical device and a related method for creating augmented reality.

The invention is in the technical field of machinery and technology present in hospital and non-hospital operating rooms, particularly in the technical field of operating microscopes.

Electronic and digital technologies have become an integral part of many areas and sectors, whether industrial or mechanical or health care and/or typical of every individual's daily life.

The importance of the interconnection of electronic tools and software, already recognized in the industrial world, represents the so called medicine 4.0 that is the transposition of industry 4.0 to the medical field.

The use of these digital technologies comprises 3D printers and the robotics, so as to achieve fast exchanges of information, not only between doctor and patient, but also between doctors from different departments and hospitals with the main goal of increasingly improving the patient-centred medicine.

In particular, considerable importance is being gained by the technological sector related to virtual reality, which, starting with video games, is being incorporated into a multitude of different applications.

The surgical world in recent decades has increasingly converted to the use of visual systems that allow a magnification and improvement of the view of the surgical field so as to have a better view of anatomical structures where the type of surgery requires it. This development allows a reduction in iatrogenic damage, postoperative complications, and health care costs.

New technologies to aid surgery include the possibility of using virtual reality and augmented reality as additional visual aids for better surgery through, for example, the use of virtual helmets or visors.

The possibility of integrating images from the computer with images from the operating field is opening a new research frontier for surgery.

Imaging has also undergone a profound transformation by completing the conversion from analog to digital and from two-dimensional to three-dimensional.

New technologies have complemented to traditional optical instruments to implement and improve, for example, radiological images, increasing them with information useful for the planning of surgery and the needs of different cases.

Specifically, in the field of maxillofacial surgery, the state of the art essentially comprises two different technologies.

More in detail, these technologies comprise Head-Mounted Systems (HMS) and Camera-Display Based Systems.

The second technology aims to achieve a better association of virtual images with real images, since the cameras, unlike HMS, are not on the head of the surgeon but are placed elsewhere in the operating room. However, this better association comes at the cost of increasing virtual reality, as the cameras no longer have the same point of view as the surgeon but, for example, the point of view of the operating lamp.

Another disadvantage is that the surgeon will see the augmented reality content projected on a screen and not looking directly at the patient.

A more recent technology, which is an evolution of HMS, is Video and Optical See Through Augmented Reality Surgical Systems (VOSTARS).

Such technology has improved features compared with HMS but has some critical issues due to system stability and image projection.

The system, in this case, is integrated into a viewer worn by the surgeon and is therefore mobile according to the movements of the surgeon, which, for long or demanding operations, may be frequent and shaky due to fatigue or other factors.

As for image projection, HMS and VOSTARS project onto a screen also worn by the surgeon and not directly onto the viewer or the lenses themselves creating additional discomfort and inconvenience to the surgeon.

Relevant prior art also comprises the patent applications WO2021/090335A1, US2015/46472A1, EP3561795A1 and WO2016/130424A1.

Therefore, is the aim of the present invention to provide an integrated optical device and a related method, which are capable of solving the above-mentioned inconveniences and criticalities.

Specifically, is the aim of the present invention to provide an integrated optical device and a related method capable of combining the advantages of using a microscope with those typical of augmented reality.

Another aim of the present invention is to provide an integrated optical device and a related method that are capable of introducing a new and greater level of virtual reality into the operating microscope.

Another aim of the present invention is to provide an integrated optical device and a related method that enable an operator, located anywhere in the world, to connect remotely, thereby enabling quick and effective consultation with operators in the operating room.

A further aim of the present invention is to provide an integrated optical device and a related method that have excellent stability, which is necessary for cameras for good image association.

Another aim of the present invention is to provide an integrated optical device and a related method capable of projecting images from two displays directly into the eyes of the surgeon allowing for high resolution of details present in CT scans or X-rays to be superimposed over the view of the operating field.

A further aim of the present invention is to realize an integrated optical device and a related method that can be integrated with existing systems and exploit and enhance their capabilities.

Another aim of the present invention is to provide an integrated optical device and a related method that enable an operator to navigate the anatomical portions that are not visible but consistently superimposed on the real anatomical portions, increasing his visual perception, or viewing the whole in a portion of the visual field.

A further aim of the present invention is to provide an integrated optical device and a related method for simulating an operation to test its difficulties, for practice or study, taking advantage of the integrated digital visual contributions of augmented and virtual reality.

Finally, a final aim of the present invention is to provide an integrated optical device and related method that enable an outside operator, even far from the operating room, to digitally insert himself within the surgical field by offering his own contribution, through the simple use of a cursor or specific tools.

These and other aims are achieved by an integrated optical device and related method according to the attached independent claims.

Further detailed technical features are given in the attached dependent claims.

The present invention will now be described, by way of illustration but not limitation, according to some of its preferred forms of implementation, and with the help of the attached figures, wherein.

FIGS. 12A and 12B represent an example of mixed reality wherein the 3D model (FIG. 12B) is recognized through the targets placed on the dental elements (FIG. 12A) and associated with the previously performed CT scan in which the mandibular nerve and dental elements are visible. Specifically, FIG. 12A represents a possible example of a view that a surgeon or operator can see, in which the 3D TC reconstruction is superimposed on the patient anatomy represented by the 3D model;

FIG. 13 illustrates a possible remote action via smartphone on the surgical field visible from the integrated optical device and by the related method according to the invention.

Referring to the mentioned figures, a preferred form of implementation of an integrated optical device and the related method according to the invention is represented in the same figures.

Referring to the figures above, the integrated optical device object of the invention is indicated with the numerical reference 100 and, in a first embodiment, according to the present invention, comprises instrumentation for creating and viewing augmented reality, which is integrated with conventional optical instruments belonging to the class of operating microscopes.

The optical instrument used may be, illustratively, an operating stereo-microscope commonly used in dental microsurgery.

Structurally, the stereo-microscope mainly consists of eyepieces, an optical body, a binocular body, and a mechanical supporting arm.

The surgeon or operator positions himself with the eyes on the eyepieces, which allow the same surgeon or operator to look at the area where the optical instrument is directed and pointed.

The integrated instrumentation of the device 100 comprises a number of elements and technologies to enable the surgeon or operator to take advantage of additional images and additional tools to be facilitated in operations or other delicate or precision actions on patients.

To achieve augmented reality, digital or virtual images must be superimposed on the real images (FIGS. 9A-9B and FIGS. 10A-10C). The real images come from known optical devices, such as optical or electron microscopes commonly used in medical and surgical settings or, as described earlier, from stereo-microscopes.

Figure 1:
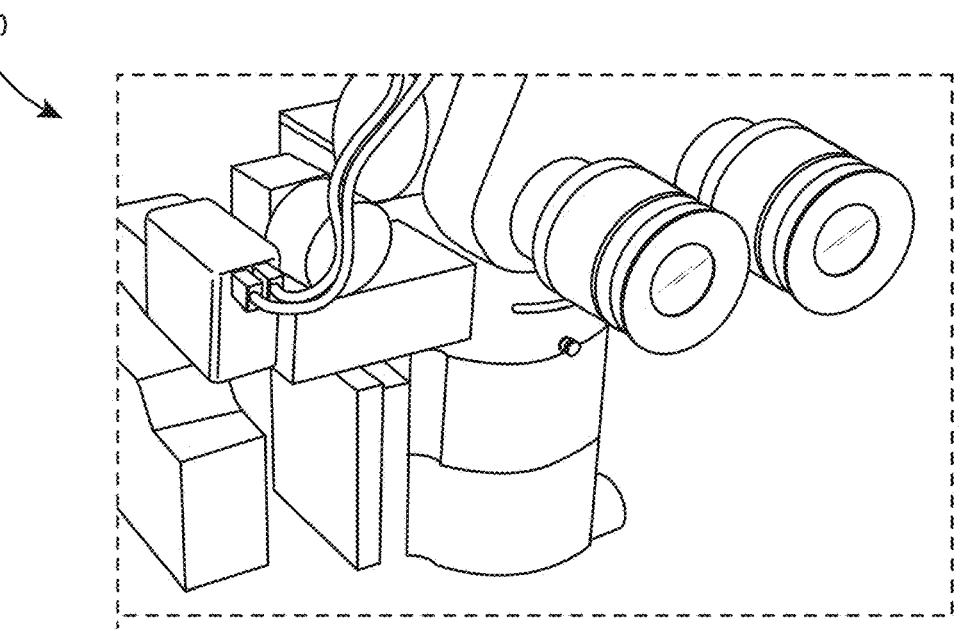
FIG. 1 shows the integrated optical device for creating augmented reality according to the invention.
Figure 2:
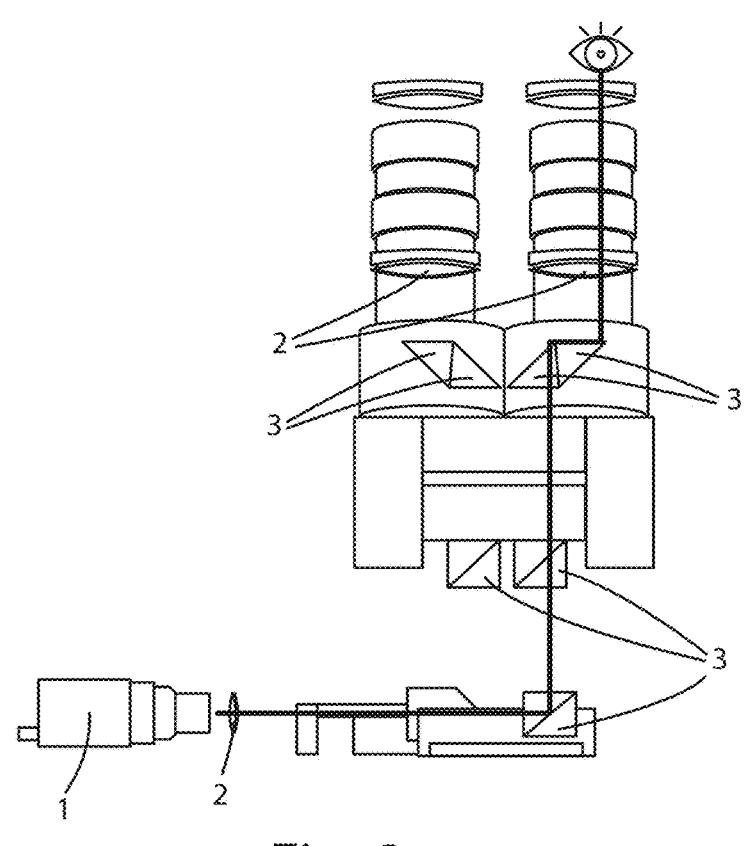
FIG. 2 shows the optical path of the camera for tracking the operator's pupil.
Figure 3A:
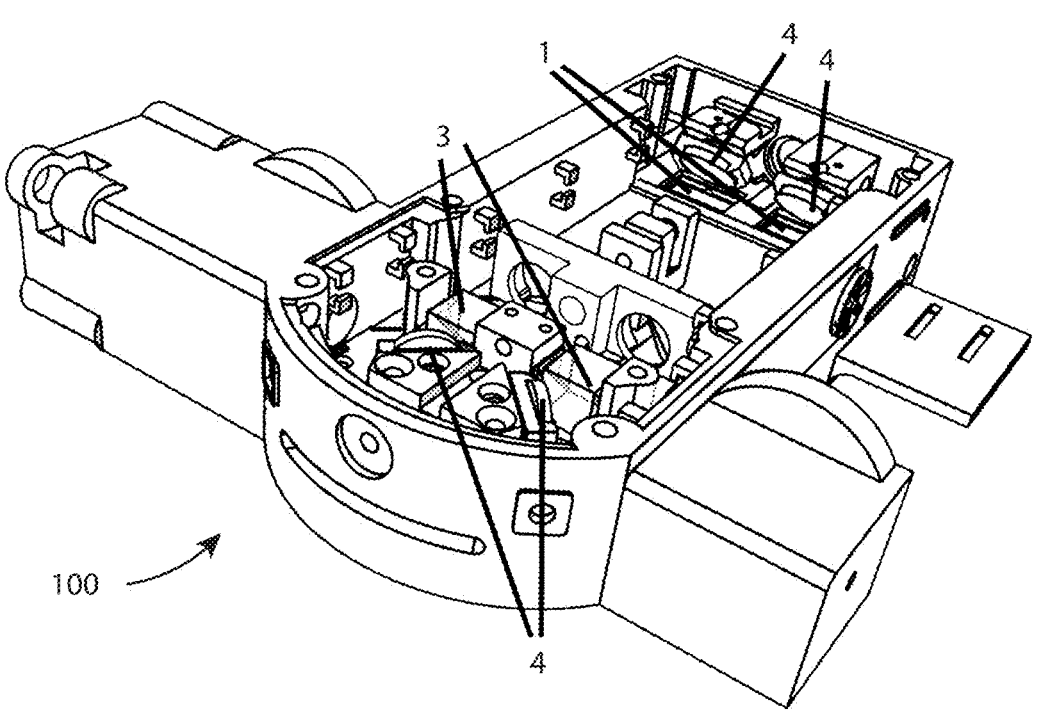
FIGS. 3A and 3B are two details of the internal components of the integrated optical device according to the invention.
Figure 3B:
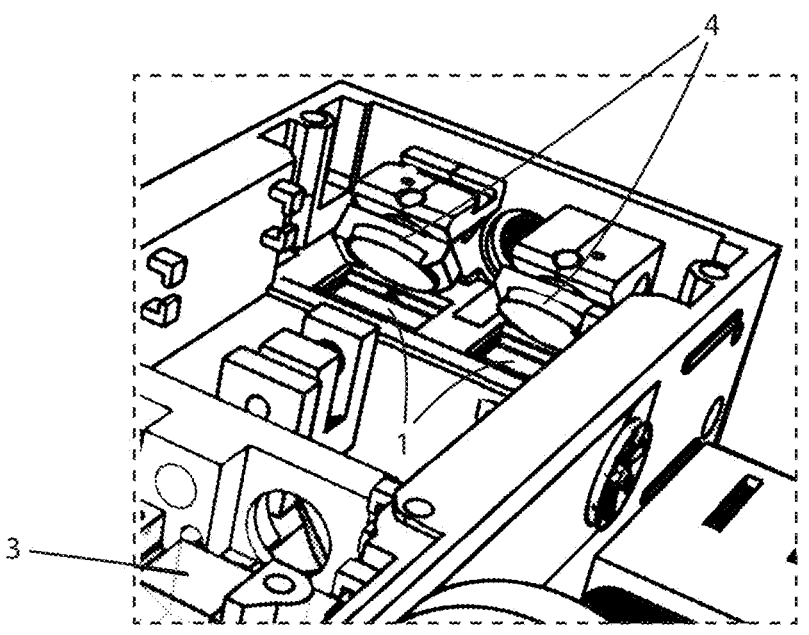
Figures 4A, 4B, 4C, 4D:
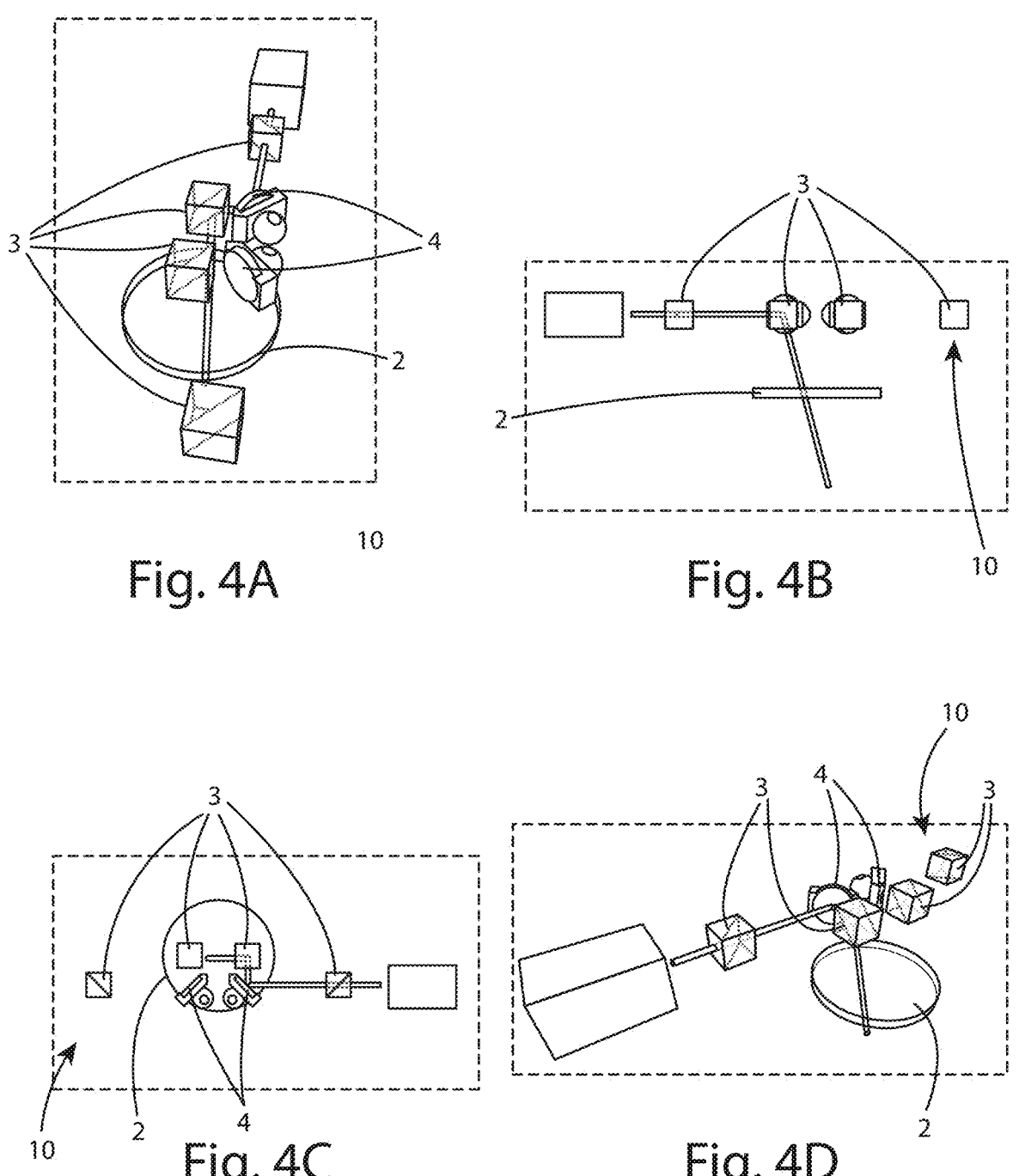
FIGS. 4A-4D are representations of the galvanometer for projecting a laser beam, comprised in the integrated optical device according to the invention.
Figures 5, 6, 7:
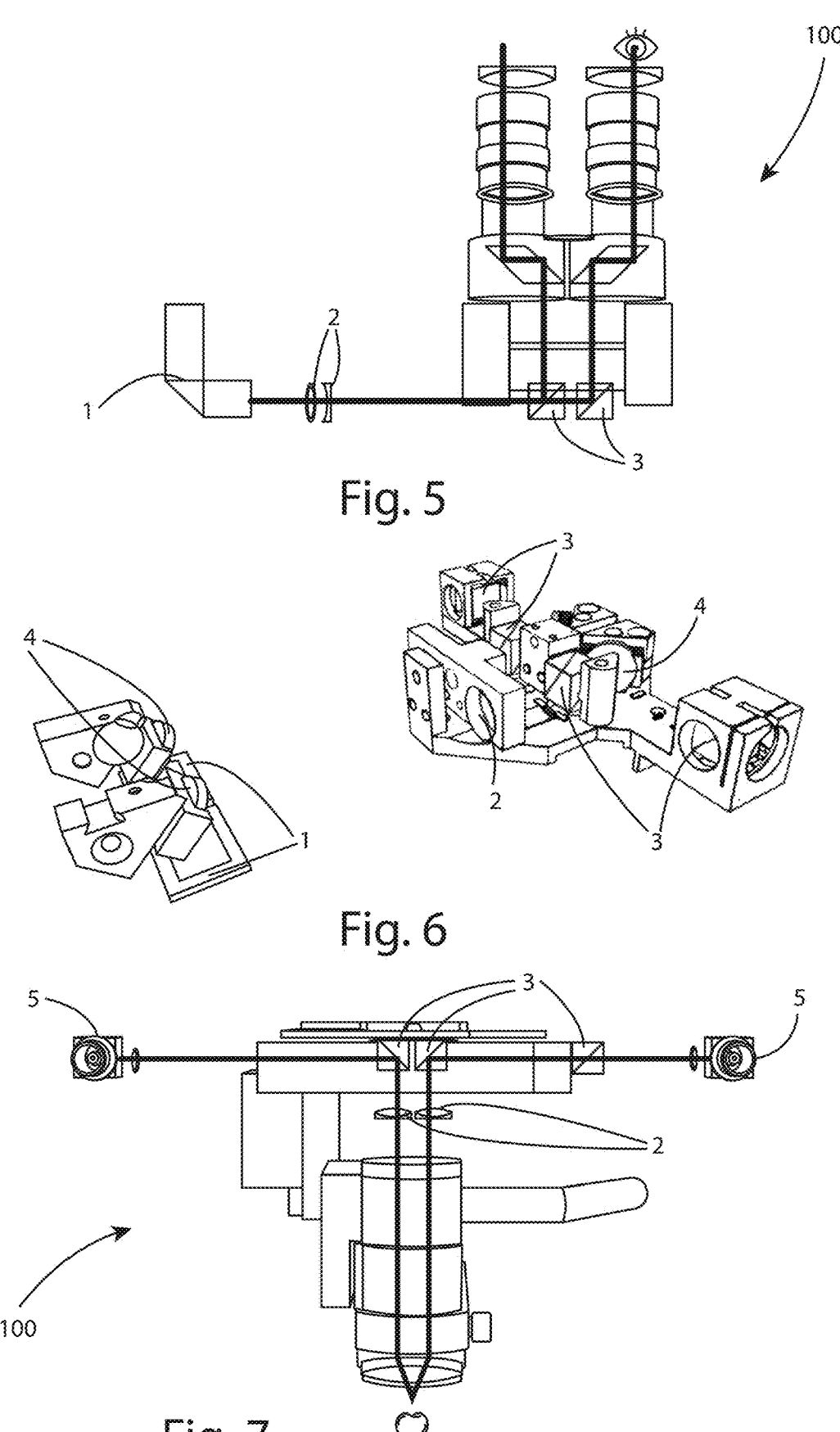
FIG. 5 shows the optical path from the displays to the eyes of the surgeon or operator within the integrated optical device according to the invention.
FIG. 6 shows the displays and assemblies of lenses, prisms and supports comprised inside the integrated optical device according to the invention.
FIG. 7 shows the optical path from the operating field to the two cameras for 3D reconstruction of objects in the field of the integrated optical device according to the invention.
Figure 8:
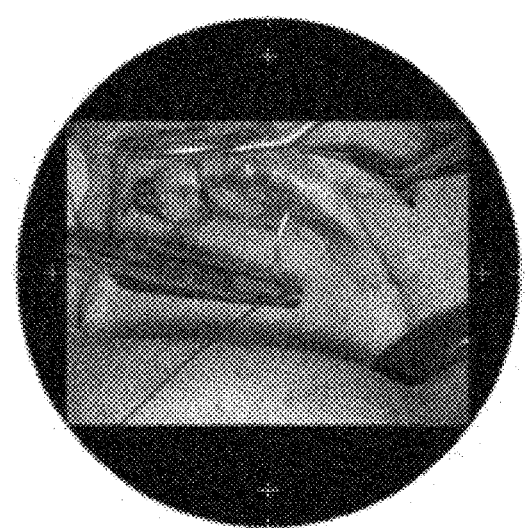
FIG. 8 is an example of what the camera sees (rectangular operating field) and what the surgeon or operator sees (full black circle) when the latter uses the integrated optical device according to the invention.

In particular, real images (FIG. 8) come from the objective of microscopes or stereo-microscopes that must be constantly illuminated. For this reason, the microscopes must be equipped with a coaxial illumination system (not shown) that illuminates the operating field.

Digital images, on the other hand, come from some screens or displays 1, which project images by being themselves a source of light and colour. The fusion of real and digital images is done by means of special semi-reflective prisms 3.

In particular, the device 100 comprises a series of display 1 that are designed to project the images that will arrive directly into the eyepieces of the optical instrument, so that the surgeon or operator does not have to move his or her eyes to access the desired information.

For each display 1, internally to the device 100, there are first holders for supporting lenses 2 that project the image through some prisms 3 contained in second holders.

Specifically, lenses 2 are intended to adjust the focus of the image and allow the same image to reach the prisms 3 made of optical glass.

The aforementioned prisms 3 are the elements necessary for the correct direction of images from the display 1 or other image sources.

Images from the operating field pass through the prisms 3 and reach the mirrors 4 and are then directed to the lateral prisms 3 and finally collected by the cameras 5.

Advantageously, a number of auxiliary accessories can be inserted between the optical body and the binocular body of the optical instrument, such as, additional eyepieces for a second observer or operator,
   photographic cameras or cameras,
   surgical lasers.

The magnification of the stereo-microscope is variable and can generally be from 4× to 20×.

An illumination system is necessary and may already be comprised within the optical body or present with illuminators, preferably external infrared (laser) connected by fibre optics. In furthermore, such an illumination system is essentially coaxial to the optical paths.

Advantageously, stereo-microscopes possess two optical paths parallel to each other; the first for the right eye and the second for the left eye.

In particular, although there are two optical paths, the objective remains single. In this way, the two optical paths have a single focal plane, unlike other technologies used in the field, to make image viewing better and more efficient and allow simultaneous visual access for both eyes, even within particularly deep and narrow cavities, while still having excellent depth perception in precision surgical operations.

The distance of the optical paths is programmed in such a way as to proportion the stereoscopic effect, which is strongly influenced by magnification.

Advantageously, the display 1 can be of any type, preferably they are AMOLED type since, in such technology, each pixel can emit light and change colour independently of the others. This feature results in greater black depth and an extremely high contrast ratio.

Optionally, by way of example, LCD displays or DLP projectors can also be used.

Images are projected into the optical pathway through the eyepieces and then to the eye of the surgeon or operator to enable the latter not to shift his eyes from the surgical area.

Still advantageously, the display 1 through the special prisms 3 in optical glass can insert images from external sources, such as computers or diagnostic devices, as well as graphic interfaces of the chosen medical devices.

Figure 9A:
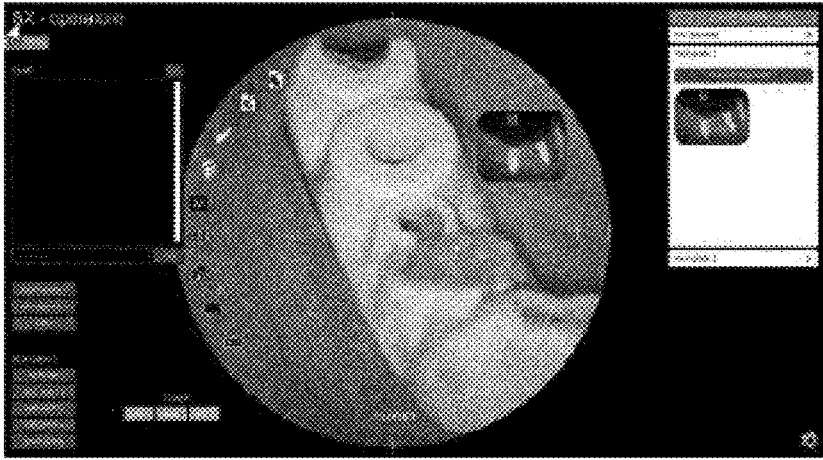
FIGS. 9A and 9B are two possible examples of views that a surgeon or operator can see, in which X-rays are placed laterally (FIG. 9A) or magnified in the centre of the field of view for better visualization (FIG. 9B)
Figure 9B:
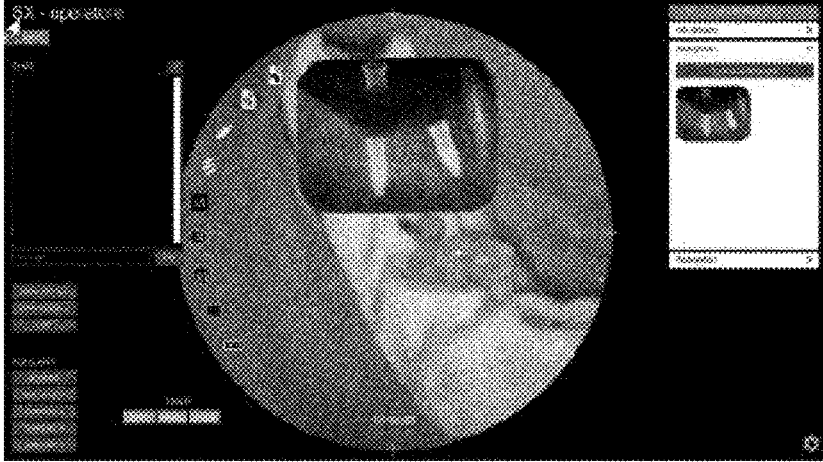

In this way, it is possible to allow the surgeon to consult the data that needs without having to take the eyes off the operating field, thus avoiding distractions and loss of time (FIGS. 9A-9B and FIG. 12A).

When the system is in operation, two cameras 5 capture images of the operative field from the individual optical paths in real time, intercepting them along the path.

Subsequently, specific software will analyse the images from the two optical paths to perform real-time three-dimensional reconstruction of the structures and objects within the operative field by identifying and associating them with those contained in the previously data or image collected in a database.

In detail, such data or images in the database may consist of two-dimensional or three-dimensional radiological information, anatomical scans, mathematical models of surgical instrumentation, etc.

Advantageously, an additional camera allows other operators or collaborators to see live images of the surgery on a monitor, or it may allow another operator, as a teacher or specialist to interact on them with a pointer 31 visible inside the microscope and moved through a computer or smartphone 32.

In detail, through this additional camera it is possible to involve further operators placed even in geographically distant locations.

A further advantage is that it is possible to create a connection between the real images and additional images that were previously acquired and processed during the planning of the surgery, so that it is possible to interact with them.

In particular, it is possible to interact simultaneously with real images and virtual images to facilitate the operations of the surgeon or provide him with more information in real time.

To do this requires that the images seen through the microscope and the previously acquired images have a relevant number of fixed or undeformable points in common.

Such common fixed points are necessary for the correct positioning and association of real images with virtual images.

For example, in addition to fixed points, object targets or plane figures recognized by software through comparison with data in an archive or database can also be used.

Optionally, fixed points can also be derived from 3D models 21 generated with the use of specific hardware and software instrumentation.

The acquired images can be obtained from, for example, X-rays, MRIs, or other diagnostic image collection methods.

Through a matching procedure, the software will be able to recognize the images and match them with the real images obtained from the optical instrument used, transferring the desired result directly to the eyepieces (FIG. 12A).

In detail, this procedure has the task of matching the fixed points of the real image with the corresponding fixed points of the virtual image.

Advantageously, the operator or surgeon has the ability to see the real images and in overlay the virtual images with the latter adjusting to the movements of the operating field or the microscope itself with a latency in the order of a few milliseconds.

This latency depends on the capabilities of the video card used and inserted into the device 100.

Even more advantageously, the operator or surgeon will have the possibility to see areas or anatomical parts that may not be visible due to overlaps with instruments or other anatomical parts of the patient.

In particular, the surgeon will also be able to have real time internal images of anatomical areas that is treating externally.

As an example, a surgeon who is treating the external part of a tooth will also be able to see simultaneously in overlay the position in the nerve positioned internally in the dental arch.

Optionally, virtual images could be reproduced in an area other than the operating field but still remaining within the eyepiece and without disturbing or obstructing the view of the surgeon or operator (FIG. 9A).

The images previously acquired are also projected using a specific type of instruments or beam splitters 10 containing the prisms 3.

In particular, these instruments or beam splitters 10, in addition to the prisms 3, comprise mirrors 4 for forming optical paths, in addition to sophisticated control electronics.

Figures 10A, 10B, 10C, 11:
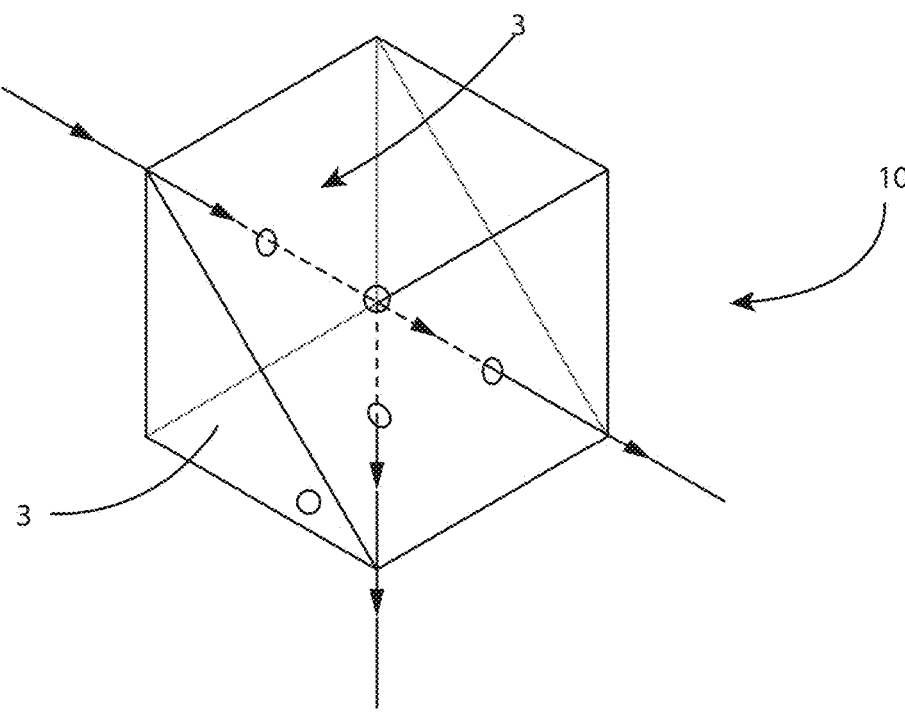
FIGS. 10A, 10B and 10C show the projection of a patient's X-rays in a negative focal plane placed inferior to the operating field, in a positive focal plane visible superior to the operating field and in a focal plane disturbed by the operating field.
FIG. 11 shows the light reflection performed by the instrument containing the beam splitters.

Beam splitters 10 are advantageously formed by two prisms 3 with a triangular base, which allow a single beam of light to be separated into two different beams, one transmitted and one reflected, with a percentage of the incident light previously defined to properly proportion the light flux from the display 1 and operating field (FIG. 11). As an illustrative but not binding example, a beam splitter with transmission and reflection proportions of 30/70% could be used.

Through these special prisms 3 pass, mixing, crossing, and sometimes flowing in opposite directions, the images destined for four shooting sources, such as:

the sources coming from the two displays 1, the sources coming from the illuminators, preferably infrared (laser), the sources from the operating field, the sources from the eyes of the observer.

Advantageously, the instrument (beam splitter) 10 is designed to maintain the necessary compactness so as not to diminish the agility of the stereo-microscope or optical instrument on which the instrument is to be installed.

Advantageously, a multilevel structure can be designed so that beam splitters 10 and mirrors 4 are placed on a first level, intercepting images from the main optical paths to share with the two cameras 5 (left and right) used for photogrammetric survey and with a third camera for sharing in the operating room monitor and optionally in monitors outside the operating room.

The same two beam splitters 10 and mirrors 4 send toward the two eyepieces the additional images from the display 1 mixing them with the real images from the main optical channels.

On a second level, a further beam splitter 10 intercepts the pupil image of the right eye of the operator coming from the eyepieces to convey it to a fourth camera capable to detect its movement.

A dual aperture placed on a lower attachment plate allows, in addition to control of depth of field, dimming or brightness enhancement of real images.

Advantageously, two 500 nm blue filters are anterpose to the cameras for photogrammetric surveying in order to optimize their target shooting.

Still advantageously, a cooling fan is installed for the heat produced by the display 1 and control electronics.

In addition, the amount of data in and out of the device necessitated the installation of an optical fibre to enable fast data and image transmission.

Advantageously, to the device 100 is connected a foot pedal or cursor or other instrument that can be operated with the feet or with techniques that do not distract the surgeon or operator from the operative field, which has the function of a cursor, so as to allow the surgeon to interact with the additional contributions in the eyepiece desktop and the integrated optical device without distracting the view from the operating field.

Advantageously, all the image creation, proper positioning, and management of images is entrusted to software and libraries appropriately programmed for the proper operation of device 100.

As an example, libraries can be used for object recognition in industrial robotics, for the use of augmented reality in video games, or for virtual simulation of interiors or architectural spaces.

Still exemplifying this, Microscope Desktop® and Microscope Connect® software have been implemented to create the graphical environments and to properly interconnect users and devices.

As described, advantageously, the introduction of augmented reality within the microscope offers an extraordinary tool for two-way communication by opening the surgical world to new roles and opportunities. In particular, assistants will be able to more directly follow events on the surgical field by interacting with it, not only in a hands-on way by positioning instruments, but also by selecting and inserting the most appropriate visual inputs needed by the surgeon or operator.

In particular, additional surgeons, operators, or assistants will be able to assist in real time through fixed or mobile devices 32 such as PCs or smartphones.

An additional laser galvanometer device, inserted into the optical system, consisting of two mirrors 4 angles to each other, allows projection of a laser beam as both a pointer and a surgical laser (FIG. 4A-4D).

Prisms 3 and specific filters are inserted into the optical path of the microscope to deflect the laser beam toward the surgical field and prevent it from being deflected toward the eyepiece of the operator.

Through the internal Microscope Desktop® application and the remote Microscope Connect® application, the laser source can be guided both for pointing and drawing (laser show) but also for surgical applications.

Said laser source projection path can also be placed outside the optical system of the microscope for example positioned under the microscope eyepiece itself.

From the description made, the characteristics of the integrated optical device and its method, which are the object of the invention, are clear, as are its advantages.

Finally, the components used, provided they are compatible with the specific use, as well as the dimensions, may be any according to the needs and state of the art.

Where the features and techniques mentioned in any claim are followed by reference marks, such reference marks have been appended for the sole purpose of increasing the intelligibility of the claims and, accordingly, such reference marks have no limiting effect on the interpretation of each element identified by way of example by such reference marks.

The invention claimed is:

1. An integrated optical device, comprising:
an optical instrument for producing real images and virtual images to a first operator,
a computer or smartphone (32) for receiving and displaying concurrent real images and virtual images of the optical instrument to a second operator, wherein the computer or smartphone (32) operates remotely with respect to said first operator and receives real-time input for said first operator from said second operator,
wherein said optical instrument for producing real images comprises, in turn,
eyepieces,
an optical body,
a binocular body,
a support arm and
an instrumentation for producing virtual images,
wherein said instrumentation for producing virtual images comprises at least a display (1) for projecting said virtual images, a lense (2) for adjusting the focus, a plurality of prisms (3) for inserting, directing, and mixing said virtual images and a plurality of mirrors (4) and first cameras (5) for directing and positioning said virtual images so as to superimpose said virtual images on said real images in the eyepieces of said optical instrument available to said first operator, said integrated optical device being characterized by comprising a pointer (31) that is visible in the eyepieces of said optical instrument available to said first operator and said pointer (32) is concurrently visible on a display of the computer or smartphone (32) and is controlled by said second operator through said computer or smartphone (32) so that said second operator is able to interact in real time with said virtual images that are superimposed to said real images.

2. The integrated optical device according to claim 1, characterized in comprising a plurality of beam splitters (10) for the projection, transmission and mixing of said virtual images and said real images, each of said beam splitters (10) comprising two prisms (3) with a triangular base positioned in contact, so as to separate a beam of light into a transmitted beam and a reflected beam, control electronics and a plurality of mirrors (4) for the formation of optical paths.

3. The integrated optical device according to claim 2, characterized in that said beam splitters (10) are positioned in a multi-level structure wherein:

in a first zone of the first level are positioned first beam splitters (10) and first mirrors (4) to intercept virtual images from the main optical paths and share them with said first cameras (5) and a third camera for sharing a monitor;

in a second zone of the first level are placed said first beam splitters (10) and second mirrors (4) for sending to said eyepieces the virtual images coming from said displays (1) mixed with the real images of the main optical channels;

in a second level, a second beam splitter (10) is positioned to intercept the image of the pupil of the right eye of the first operator coming from said eyepieces and convey it to a fourth camera capable of detecting its movement.

4. The integrated optical device according to claim 1, characterized in comprising a dual aperture to allow depth of field and dimming or brightness enhancement of said real images.

5. The integrated optical device according to claim 1, characterised in comprising a foot pedal or a cursor or other instrument operable by said first operator, so as to allow said first operator to interact with said integrated optical device without distracting the view of said first operator from an operating field.

6. The integrated optical device according to claim 1, characterized in comprising a laser galvanometer device, which projects a laser beam, said laser beam being deflected toward said operating field by means of an optical system consisting of two mirrors (4), angled to each other, of said set of mirrors (4), said prisms (3) and specific optical filters, which prevent deflections of the laser beam toward said eyepieces of said first operator.

7. The integrated optical device according to claim 6, characterized in that said laser beam is guided to point and draw and to perform surgical applications, via an internal software application, such as Microscope Desktop®, and via a remote software application, such as Microscope Connect®.

8. The integrated optical device according to claim 1, characterized in comprising two blue filters antepose to said first cameras (5).

\* \* \* \* \*